United States Patent
Chapman et al.

(10) Patent No.: US 11,804,006 B2
(45) Date of Patent: Oct. 31, 2023

(54) ENHANCED VISION SYSTEM AND METHOD

(71) Applicant: Disney Enterprises, Inc., Burbank, CA (US)

(72) Inventors: Steven M. Chapman, Newbury Park, CA (US); Matthew Deuel, Playa Vista, CA (US); Daniel Baker, Los Angeles, CA (US); Dane Coffey, Burbank, CA (US); Mark R. Mine, Canyon Country, CA (US); Evan Goldberg, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 315 days.

(21) Appl. No.: 16/892,194

(22) Filed: Jun. 3, 2020

(65) Prior Publication Data

US 2021/0383595 A1 Dec. 9, 2021

(51) Int. Cl.

| | |
|---|---|
| *G09G 5/00* | (2006.01) |
| *G06T 15/20* | (2011.01) |
| *G06T 7/579* | (2017.01) |
| *G01S 17/89* | (2020.01) |
| *H04W 4/02* | (2018.01) |
| *G06F 1/16* | (2006.01) |
| *H04W 4/029* | (2018.01) |

(52) U.S. Cl.
CPC ............ *G06T 15/205* (2013.01); *G01S 17/89* (2013.01); *G06F 1/163* (2013.01); *G06T 7/579* (2017.01); *H04W 4/026* (2013.01); *H04W 4/029* (2018.02); *G06T 2215/16* (2013.01)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| | | | |
|---|---|---|---|
| 9,196,067 B1 * | 11/2015 | Freed .................... | G01S 17/894 |
| 2011/0216179 A1 * | 9/2011 | Dialameh .......... | G06K 9/00664 |
| | | | 348/62 |
| 2018/0048750 A1 * | 2/2018 | Hardi ....................... | B62D 1/04 |

* cited by examiner

*Primary Examiner* — Gordon G Liu
(74) *Attorney, Agent, or Firm* — Farjami & Farjami LLP

(57) ABSTRACT

In one implementation, an enhanced vision system includes a portable user device, a base station including a hardware processor and a memory storing a virtual effects rendering software code, and a display device communicatively coupled to the base station. The hardware processor executes the virtual effects rendering software code to detect the presence of the portable user device in a real-world environment, obtain a mapping of the real-world environment, and identify one or more virtual effect(s) for display in the real-world environment. The hardware processor further executes the virtual effects rendering software code to detect actuation of the portable user device, and to control the display device to display the virtual effect(s) in the real-world environment based on the mapping, and the position and orientation of the portable user device during the detected actuation.

20 Claims, 6 Drawing Sheets

ENHANCED VISION SYSTEM AND METHOD

BACKGROUND

In augmented reality (AR), the appearance of real-world objects and/or environments can be digitally modified using virtual imagery to provide a user with the illusion of having enhanced vision, such as the illusion of having "x-ray" vision enabling the user to see features obscured by an opaque surface. AR is increasingly used to produce entertainment experiences that are more immersive and engaging. Moreover, AR can be used to modify images of the real-world through augmentation in ways that have a wide variety of practical applications beyond entertainment. However, a user wishing to experience the enhanced vision made possible by AR must typically view real-world objects through AR glasses or using an AR headset in order to see those real-world objects overlaid by virtual projections.

Unfortunately, AR glasses and headsets can be costly and inconvenient to wear. In addition, the increased concern over the spread of communicable disease will likely mandate burdensome sanitation procedures in usage environments in which wearable AR viewing equipment is shared by multiple users. Moreover, requiring the use of an AR headset or glasses to enjoy an enhanced vision experience effectively precludes multiple users from sharing the same experience. Consequently, there is a need in the art for an AR solution enabling one or more users to enjoy enhanced vision without requiring the user or users to don AR eyewear or headgear.

SUMMARY

There are provided enhanced vision systems and methods, substantially as shown in and/or described in connection with at least one of the figures, and as set forth more completely in the claims.

DETAILED DESCRIPTION

Figure 1A:
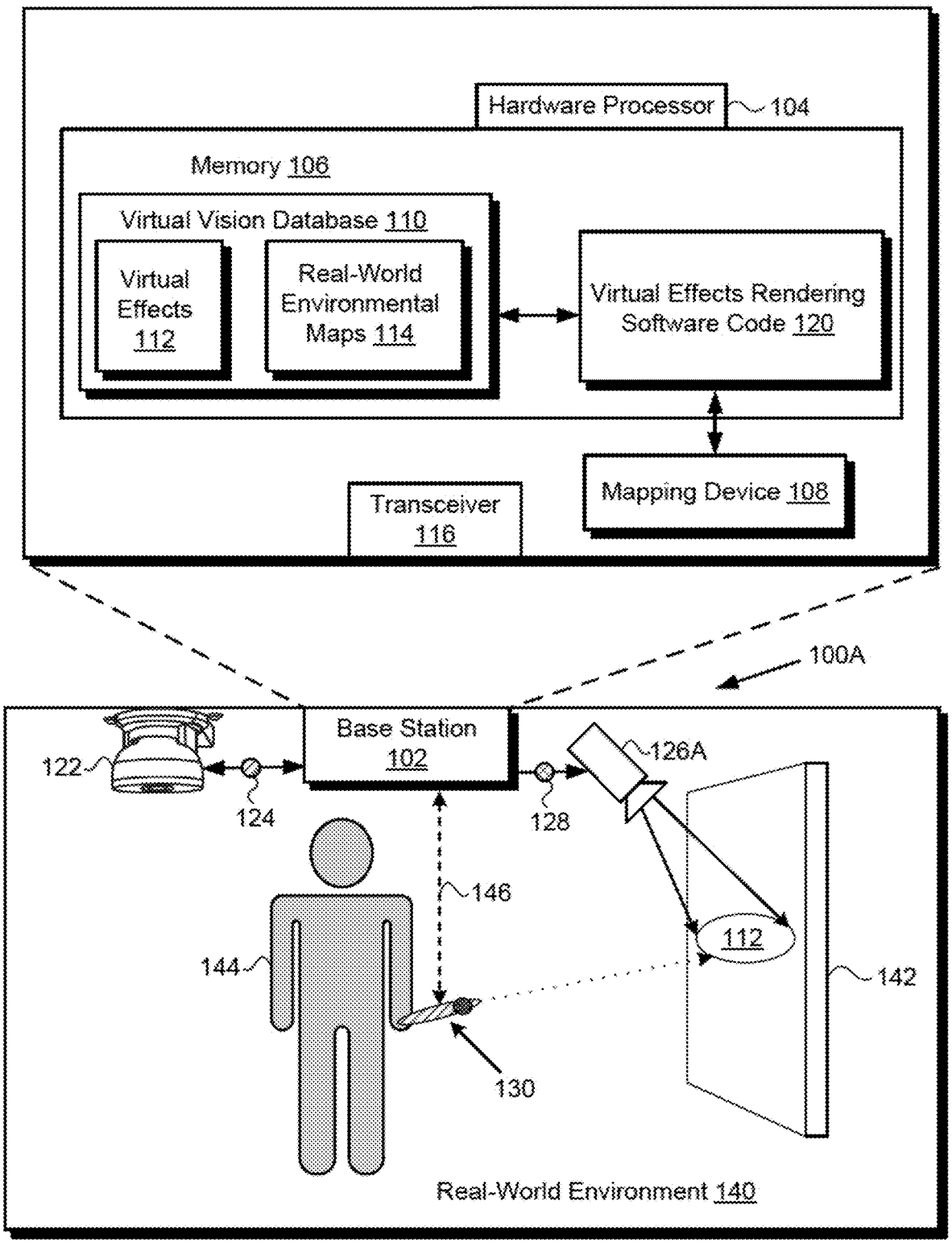
FIG. 1A shows a diagram of an exemplary enhanced vision system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses enhanced vision systems and methods that overcome the drawbacks and deficiencies in the conventional art. According to the present novel and inventive concepts, a system user can experience the enhanced vision made possible by augmented reality (AR) without the discomfort or inconvenience associated with wearing AR eyewear or headgear. Instead, the user may actuate a portable device, such as a handheld device simulating a laser pointer or flashlight, for example, to point at an object or a region of the user's real-world environment. Based on the particular application of the enhanced vision system, a mapping of the environment in which the portable user device is utilized, the location and orientation of the portable user device when it is actuated, and in some implementations the perspective of the user with respect to the object or region pointed to, virtual effects providing an enhanced vision experience am displayed to the user. The enhanced vision solution disclosed by the present application may advantageously be utilized in a wide variety of use cases including, but not limited to, AR games, architectural inspection, and industrial and residential safety.

It is noted that, as used herein, the feature "virtual effect" refers to one or more virtual images used to overlay an image of a real-world object. Moreover, "virtual effect" refers to one or more virtual images in the form of environmental features, such as lighting, color, or structural/architectural features of a venue, or to simulations of persons, avatars, characters, caricatures of a person, animals, plants, and living things of various species or varieties, as well as inanimate objects.

FIG. 1A shows a diagram of exemplary enhanced vision system 100A, according to one implementation. As shown in FIG. 1A, enhanced vision system 100A includes base station 102 having hardware processor 104 and memory 106 implemented as a non-transitory storage device. In addition, in some implementations, base station 102 may include one or both of mapping device 108 and transceiver 116. According to the implementation shown in FIG. 1A, virtual effects rendering software code 120 and enhanced vision database 110 are stored in memory 106. Enhanced vision database 110 includes virtual effects 112 and real-world environmental maps 114.

In addition to base station 102, enhanced vision system 100A also includes portable user device 130, and display device 126A communicatively coupled to base station 102. Furthermore, in some implementations, enhanced vision system 100A may include tracking device 122. It is noted, that as defined for the purposes of the present application, the expression "communicatively coupled" may mean physically integrated with, or physically discrete from but in communication with. Thus, display device 126A may be integrated with base station 102, or may be adjacent to or remote from base station 102 while being in wired or wireless communication with base station 102.

As further shown in FIG. 1A, enhanced vision system 100A is implemented within real-world environment 140 including one or more objects or structures, represented by wall structure 142 in FIG. 1A. Portable user device 130 is configured to be used by user 144. Also shown in FIG. 1A are tracking data 124 received by base station 102 from optional tracking device 122, display data 128 provided as an output to display device 126A by base station 102, and optional wireless communication link 146 communicatively coupling base station 102 and portable user device 130.

According to the exemplary implementation shown in FIG. 1A, portable user device 130 may be a handheld device, such as a replica of a laser pointer or flashlight, for example. It is noted that the term "replica" refers to an object that physically resembles another object having a specific functionality, while lacking that functionality. Thus, a replica of a laser pointer or flashlight would appear to a casual observer to appear to be that object despite not being capable of emitting light. Analogously, a replica of a weapon such as a light saber might be a toy or prop resembling a weapon but not designed to be used in actual combat.

However, in other implementations, portable user device 130 may be a wearable device, such as a replica of a scanner, camera, or other type of sensing device worn, for example, on a lanyard, by user 144. Base station 102 is configured to track portable user device 130 in real-world environment 140. In some implementations, portable user device 130 may be a smart device, such as a smartphone, tablet computer, or any of the exemplary replica devices identified above that include smart technology similar to that included in a smartphone or tablet computer. In some of those implementations, base station 102 may track portable user device 130 by receiving position and orientation data from portable user device 130 via wireless communication link 146, where the position and orientation data describe the location, yaw, pitch, and roll of portable user device 130.

In some implementations, portable user device 130 may be a replica device lacking smart technology. In those implementations, enhanced vision system 100A may include tracking device 122 communicatively coupled to base station 102 and configured to determine the position and orientation of portable user device 130 in real-world environment 140. For example, portable user device 130 may include one or more infrared (IR) emitters tracked by tracking device 122 in the form of an IR camera or other IR sensor. Alternatively, or in addition, tracking device 122 may include a camera, camera array, or one or more other type of optical sensor for determining the position and orientation of portable user device 130 in real-world environment 140.

As another alternative, or in addition, tracking device 122 may include multiple components distributed within real-world environment 140 and configured to perform radio-signal triangulation to determine the position and orientation of portable user device 130. As yet another alternative, base station 102 may utilize optional mapping device 108 configured to perform simultaneous localization and mapping (SLAM) to determine the position and orientation of portable user device 130 in real-world environment 140.

In addition to determining the position and orientation of portable user device 130 in real-world environment 140, enhanced vision system 100A may further determine the viewing perspective of user 144 of portable user device 130. For example, in some implementations, tracking device 122 may be configured to perform eye tracking or skeleton tracking of user 144 in real-world environment 140. Alternatively, or in addition, tracking data 124 generated by tracking device 122 may include optical data enabling virtual effects rendering software code 120, executed by hardware processor 104 of base station 102, to estimate the viewing perspective of user 144 based on the distance separating the eyes of user 144 from portable user device 130, and/or based on the head position of user 144.

Base station 102 is configured to communicate with tracking device 122 or directly with portable user device 130 to detect actuation of portable user device 130 by user 144. For example, where portable user device 130 is a replica of a flashlight, actuation of portable user device 130 may include pointing portable user device 130 at an object or structure within real-world environment 140, such as wall structure 142 for example, and pressing a button or other actuation controller on portable user device 130 to mimic illuminating the replica flashlight. Analogously, where portable user device 130 is a replica of a laser pointer, or other pointing device, actuation of portable user device 130 may include pointing portable user device 130 at an object or structure within real-world environment 140, such as wall structure 142 for example, and pressing a button or other controller on portable user device 130 to mimic actuation of the replica pointing device.

When actuation of portable user device 130 is detected, base station 102 controls display device 126A, using display data 128, to display one or more virtual effects 112 in real-world environment 140 based on a mapping of real-world environment 140, and at least the position and orientation of portable user device 130 during the detected actuation. Moreover, in some implementations, virtual effects 112 may be displayed under the control of base station 102 using the viewing perspective of user 144, for example by utilizing an image-warping technique, as known in the art, to correct for the viewing perspective of user 144.

In some implementations, as shown in FIG. 1A, display device 126A may include one or more projectors, and controlling display device 126A projects one or more virtual effects 112 onto the surface of wall structure 142 or another surface within real-world environment 140. When implemented as one or more projectors, display device 126A may include a stand-alone wide-field projection system, such as a spinning point-of-view (POV) projected illumination "spinning scan line," for example. Alternatively, display device 126A may be implemented as a fisheye lens projector, or as multiple stitched projection-mapped video projectors.

It is noted that, although the present application refers to virtual effects rendering software code 120 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of base station 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

In some implementations, real-world environment 140 may take the form of an indoor venue. Such indoor venues may include a personal residence, a factory or other industrial facility, or a film or broadcast studio, to name a few examples. It is noted that although FIG. 1A explicitly shows real-world environment 140 to include only wall structure 142, that simplified representation is provided merely for conceptual clarity. More generally, real-world environment 140 may include multiple structures, such as walls corresponding to wall structure 142, as well as a ceiling, floor, and one or more objects, such as articles of furniture, art or decorative objects, and manufacturing equipment or other machinery, to name a few examples.

Figure 1B:
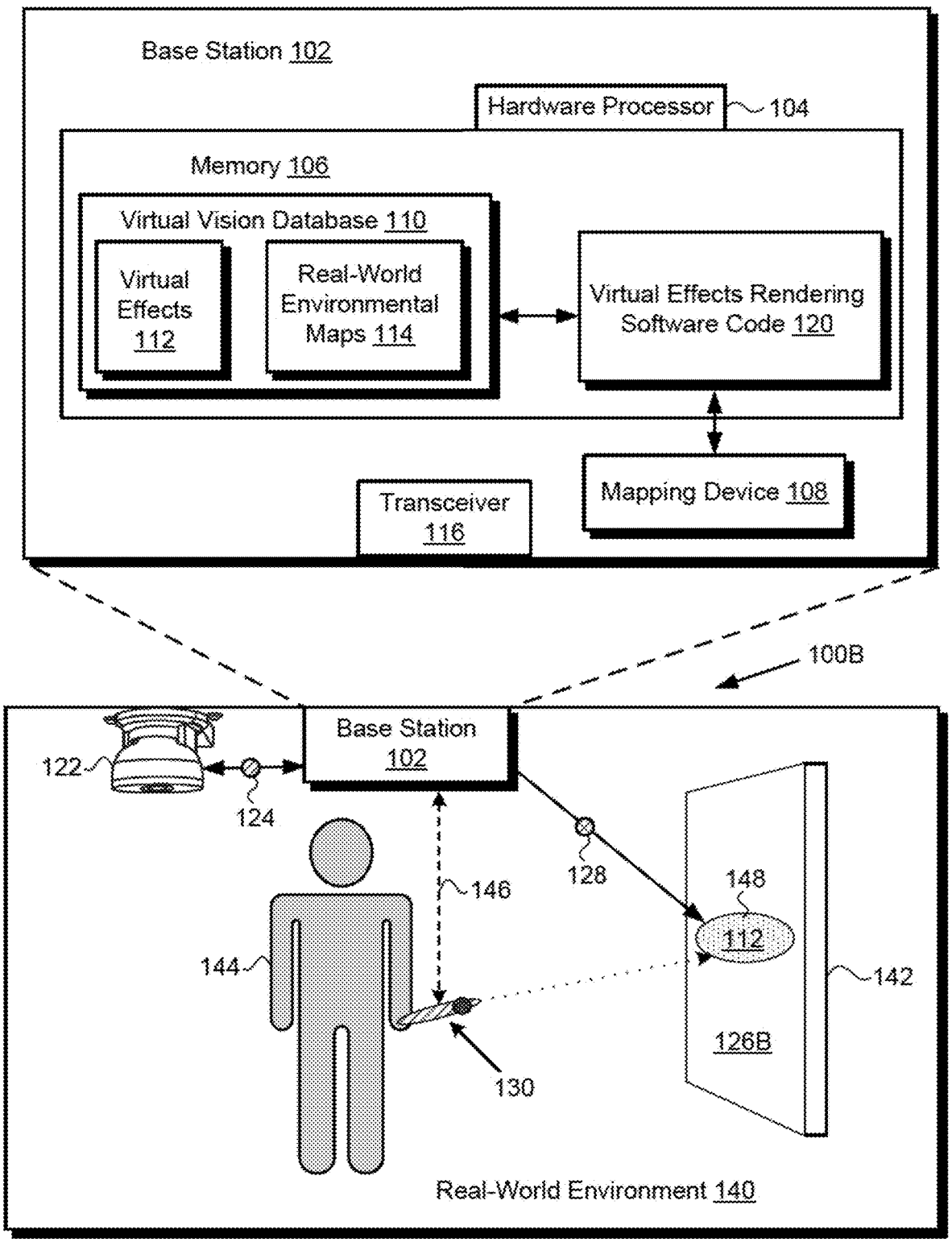
FIG. 1B shows a diagram of an exemplary enhanced vision system, according to another implementation.

FIG. 1B shows a diagram of exemplary enhanced vision system 100B, according to another implementation. It is noted that enhanced vision system 100B, in FIG. 1B, corresponds in general to enhanced vision system 100A, in FIG. 1A, and may share any of the characteristics attributed to that corresponding system by the present disclosure. It is further noted that any feature in FIG. 1B identified by a reference number identical to a reference number appearing in FIG. 1A corresponds to that previously described feature and may share any of the characteristics attributed to it above.

According to the exemplary implementation shown in FIG. 1B, and in contrast to the implementation shown in FIG. 1A, display device 126B of enhanced vision system 100B is wall structure 142 of real-word environment 140, where wall structure 142 includes multiple display elements 148. In the exemplary implementation shown in FIG. 1B, base station 102 controls display device 126B using display data 128 to activate at least some of display elements 148 of wall structure 142, to render one or more virtual effects 112. In various implementations, wall structure 142 may be a light-emitting diode (LED) wall including display elements 148 in the form of LEDs, or may be an organic light-emitting diode (OLED) wall including display elements 148 in the form of OLEDs.

Figure 2:
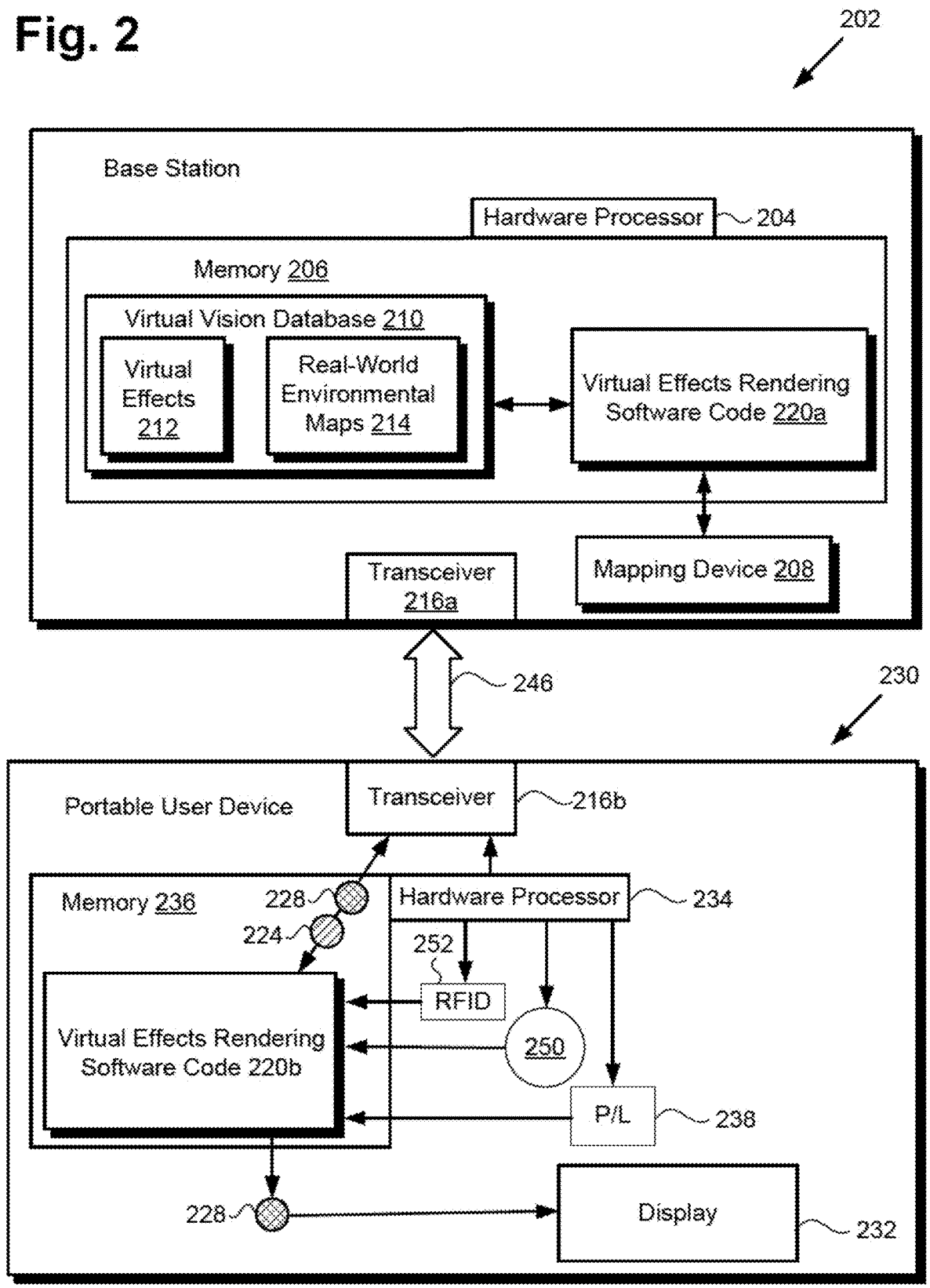
FIG. 2 shows a diagram including a more detailed exemplary representation of a portable user device of the enhanced vision systems shown in FIGS. 1A and 1B, according to one implementation.

FIG. 2 shows a more detailed representation of exemplary portable user device 230 in combination with base station 202, according to one implementation. As shown in FIG. 2, portable user device 230 is communicatively coupled to base station 202 by wireless communication link 246. Base station 202 includes hardware processor 204 and memory 206 implemented as a non-transitory storage device. In addition, in some implementations, base station 202 may include one or both of mapping device 208 and transceiver 216a. As further shown in FIG. 2, memory 206 contains virtual effects rendering software code 220a and enhanced vision database 210 storing virtual effects 212 and real-world environmental maps 214.

Portable user device 230 includes hardware processor 234 and memory 236 implemented as a non-transitory storage device storing virtual effects rendering software code 220b. As also shown in FIG. 2, portable user device 230 may include any or all of transceiver 216b, one or more cameras 250 (hereinafter "camera(s) 250"), radio-frequency identification (RFID) reader 252, one or more position/location sensors 238 (hereinafter "P/L sensor(s) 238"), and display 232 receiving display data 228 from virtual effects rendering software code 220b. Also shown in FIG. 2 is tracking data 224 generated by portable user system 230 and transmitted to base station 202 via wireless communication link 246.

Base station 202 having hardware processor 204, memory 206 including enhanced vision database 210 storing virtual effects 212 and real-world environmental maps 214, and optional mapping device 208, corresponds in general to base station 102 having hardware processor 104, memory 106 including enhanced vision database 110 storing virtual effects 112 and real-world environmental maps 114, and optional mapping device 108, in FIGS. 1A and 1B. Thus, base station 202, hardware processor 204, memory 206, enhanced vision database 210, virtual effects 212, real-world environmental maps 214, and optional mapping device 208 may share any of the characteristics attributed to respective base station 102, hardware processor 104, memory 106 enhanced vision database 110, virtual effects 112, real-world environmental maps 114, and optional mapping device 108 by the present disclosure, and vice versa.

In addition, transceiver 216a and virtual effects rendering software code 220a of base station 202 correspond respectively in general to transceiver 116 and virtual effects rendering software code 120, in FIGS. 1A and 1B. Consequently, transceiver 116 and virtual effects rendering software code 120 may share any of the characteristics attributed to respective transceiver 216a and virtual effects rendering software code 220a by the present disclosure, and vice versa. It is also noted that tracking data 224, display data 228, and wireless communication link 246, in FIG. 2, correspond respectively in general to tracking data 124, display data 128, and wireless communication link 146, in FIGS. 1A and 1B, and those corresponding features may share any of the characteristics attributed to either corresponding feature herein.

Portable user device 230 corresponds in general to portable user device 130, in FIGS. 1A and 1B, and those corresponding features may share any of the characteristics attributed to either corresponding feature by the present disclosure. Thus, like portable user device 230, portable user device 130 may include features corresponding to hardware processor 234, transceiver 216b, camera(s) 250, RFID reader 252, P/L sensor(s) 238, display 232, and memory 236 storing virtual effects rendering software code 220b. Moreover, like portable user device 130, portable user device 230 may take a variety of forms. For example, as described above by reference to FIG. 1A, portable user device 130/230 may be a handheld device, such as a replica of a laser pointer or flashlight, for example, or a wearable device, such as a replica of a scanner, camera, or other type of sensing device worn, for example on a lanyard. Base station 102/202 is configured to determine the position and orientation of portable user device 130/230 in real-world environment 140. As shown in FIG. 2, in some implementations, portable user device 130/230 may be a smart device, such as a smartphone, tablet computer, or any of the exemplary replica devices described above that include smart technology similar to that included in a smartphone or tablet computer.

Transceiver 116/216a and/or transceiver 216b may be implemented as wireless communication hardware and software enabling portable user device 130/230 to exchange data with base station 102/202 via wireless communication link 146/246. For example, transceiver 116/216a and/or transceiver 216b may be implemented as fourth generation of broadband cellular technology (4G) wireless transceivers, or as 5G wireless transceivers configured to satisfy the IMT-2020 requirements established by the International Telecommunication Union (ITU). Alternatively, or in addition, transceiver 116/216a and/or transceiver 216b may be configured to communicate via one or more of WiFi, Bluetooth, ZigBee, and 60 GHz wireless communications methods.

Camera(s) 250 may include one or more red-green-blue (RGB) still image cameras and/or video cameras. Moreover, in some implementations, camera(s) 250 may correspond to an array of RGB still image and/or video cameras configured to generate a panoramic image of a venue, such as real-world environment 140.

Display 232 may take the form of a display screen, such as a touchscreen display implemented as a liquid crystal display (LCD), an LED display, an OLED display, or using any other suitable display technology that performs a physical transformation of signals to light.

P/L sensor(s) 238 may include one or more accelerometers, and/or gyroscopes, and/or a GPS receiver, and/or a magnetometer, for example. In some implementations, P/L sensor(s) 238 may be implemented as an inertial measurement unit (IMU), as known in the art.

With respect to virtual effects rendering software code 220b, it is noted that in some implementations, virtual effects rendering software code 220b may be a thin client application of virtual effects rendering software code 120/220a. In those implementations, virtual effects rendering software code 220b may enable portable user device 130/230 to provide tracking data 224 to base station 102/202 for processing, and to receive display data 228 including images suitable for rendering on display 232, such as a video game interface or utility charts, tables, or specifications, for example. Moreover, in some implementations, virtual effects rendering software code 220b, executed by hardware processor 234 of portable use device 130/230, may detect actuation of portable user device 130/230 by user 144, and may communicate that detected actuation to base station 102/202.

According to the exemplary implementation shown in FIG. 2, virtual effects rendering software code 220b is located in memory 236, subsequent to transfer of virtual effects rendering software code 220b to portable user device 130/230 over a packet-switched network, such as the Internet, for example. Once present on portable user device 130/230, virtual effects rendering software code 220b may be persistently stored in memory 236 and may be executed locally on portable user device 130/230 by hardware processor 234.

Figure 3:
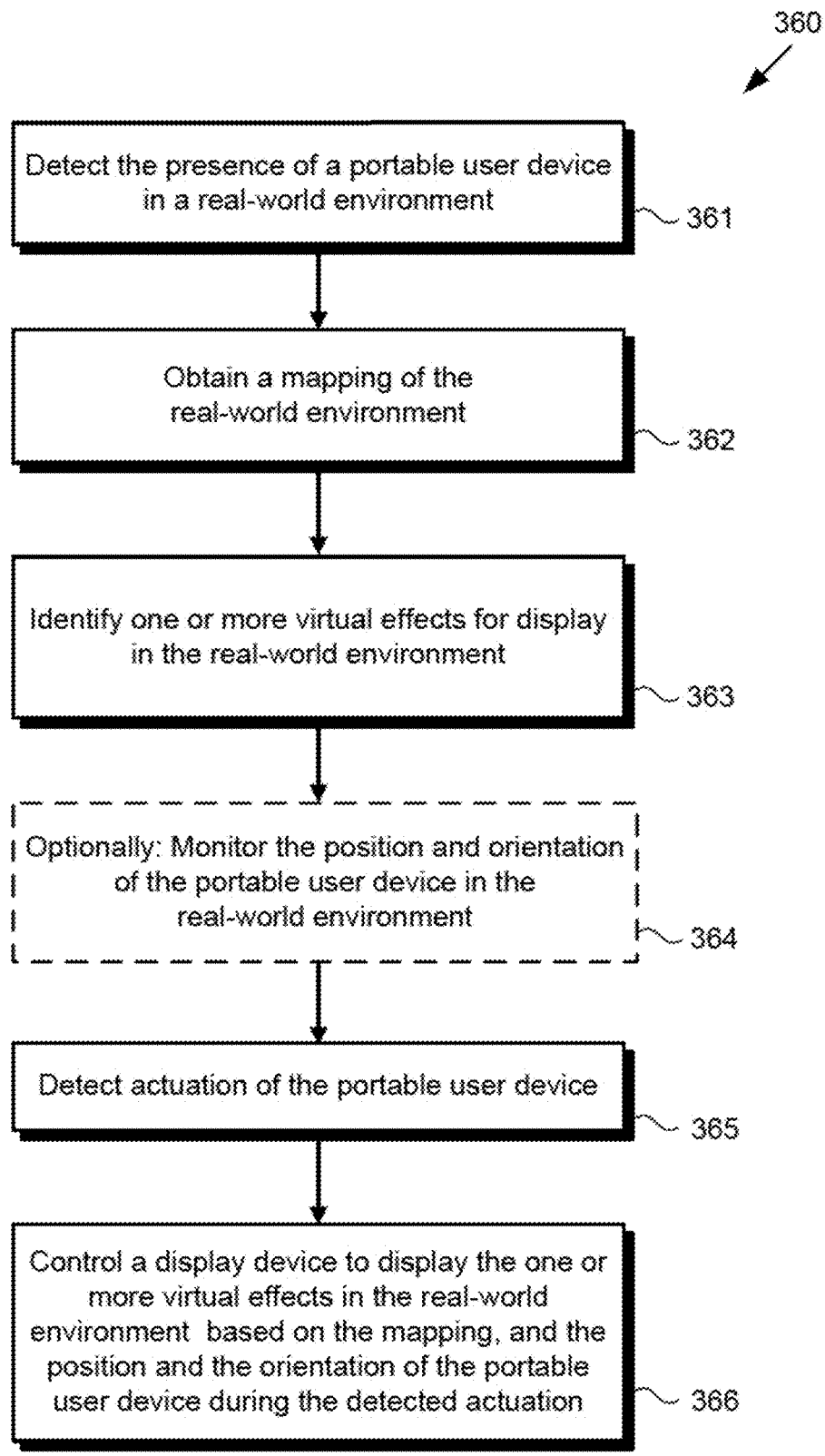
FIG. 3 is a flowchart presenting an exemplary enhanced vision method, according to one implementation.

The functionality of virtual effects rendering software code 120/220a of base station 102/202 will be further described by reference to FIG. 3 in combination with FIGS. 1A, 1B, and 2. FIG. 3 shows flowchart 360 presenting an exemplary method for use by an enhanced vision system. With respect to the method outlined in FIG. 3, it is noted that certain details and features have been left out of flowchart 360 in order not to obscure the discussion of the inventive features in the present application.

Referring to FIG. 3 in combination with FIGS. 1A, 1B, and 2, flowchart 360 begins with detecting the presence of portable user device 130/230 in real-world environment 140 (action 361). As noted above, enhanced vision system 100A/100B may include tracking device 122 communicatively coupled to base station 102/202. Tracking device 122 may be configured to detect the presence of portable user device 130/230 within real-world environment 140, as well as to determine the position and orientation of portable user device 130/230 in real-world environment 140. For example, and as also noted above, portable user device 130/230 may include one or more IR emitters detectable by tracking device 122 in the form of an IR camera or other IR sensor. Alternatively, or in addition, tracking device 122 may include a camera, camera array, or one or more other type of optical sensor for detecting the presence of portable user device 130/230 in real-world environment 140. Detection of the presence of portable user device 130/230 in real-world environment 140 using tracking device 122 may be performed by virtual effects software code 120/220a of base station 102/202, executed by hardware processor 104.

Alternatively, or in addition, in some implementations, portable user device 130/230 may include RFID reader 252 and/or P/L sensor(s) 238, and may be configured to report its presence in real-world environment 140 to base station 102/202. In those implementations, portable user device 1301230 may utilize transceiver 216b and wireless communication link 146/246 to self-report its presence in real-world environment 140. In those implementations, virtual effects software code 120/220a of base station 102/202, executed by hardware processor 104/204, may utilize transceiver 116/216a and wireless communication link 146/246 to detect the presence of portable user device in real-world environment 140 by receiving tracking data 224 from portable user device 130/230.

Flowchart 360 continues with obtaining a mapping of real-world environment 140 (action 362). In some implementations, one or more real-world environmental maps 114/214 of real-world environment 140 may be stored in enhanced vision database 110/210. For example, where real-world environment 140 is a residential venue or a commercial or industrial venue, one or more real-world environmental maps 114/214 of that venue may have been generated during construction of the venue and stored in enhanced vision database 110/210, for example to map the locations of wires, pipes, and structural support features within the walls of those venues. In use cases in which the mapping of real-world environment 140 is stored in enhanced vision database 110/210, hardware processor 104/204 of base station 102/202 may execute virtual effects rendering software code 120/220a to obtain the mapping from enhanced vision database 110/210.

As noted above, in some implementations, enhanced vision system 100A/100B may include mapping device 108/208. Mapping device 108/208 may include a camera, such as a three hundred and sixty degree (360°) camera, a camera array, or one or more other type of optical sensor for mapping real-world environment 140. Alternatively, or in addition, mapping device 108/208 may include a Light Detection and Ranging (lidar) device for mapping real-world environment 140. Thus, in some implementations, obtaining the mapping of real-world environment 140 may be performed by virtual effects software code 120/220a of base station 102/202, executed by hardware processor 104/204, and using mapping device 108/208.

Flowchart 360 continues with identifying one or more virtual effects 112/212 for display in real-world environment 140 (action 363). In use cases in which real-world environment 140 is a residential venue or a commercial or industrial venue, and where one or more real-world environmental maps 114/214 of that venue may have been generated during construction of the venue to map the locations of wires, pipes, and structural support features within the walls of those venues, for example, virtual effects 112/212 may be imagery depicting the location of those features. Alternatively, in use cases in which real-world environment 140 is used as a venue supporting interaction by user 144 with a video game, virtual effects 112/212 may include images of the gaming environment, objects, or characters to be overlaid on portions of real-world environment 140. Action 363 may be performed by virtual effects software code 120/220a of base station 102/202, executed by hardware processor 104/204, and using enhanced vision database 110/210.

In some implementations, flowchart 360 may continue with optionally monitoring the position and orientation of portable user device 130/230 in real-world environment 140 (action 364). As discussed above, enhanced vision system 100A/100B may include tracking device 122 communicatively coupled to base station 102/202. Tracking device 122 may be configured to monitor the position and orientation of portable user device 130/230 in real-world environment 140 while tracking the movement of portable user device 130/230 in real-world environment 140. For example, and as also discussed above, portable user device 130/230 may include one or to more IR emitters detectable by tracking device 122 in the form of an IR camera or other IR sensor. Alternatively, or in addition, tracking device 122 may include a camera, camera array, or one or more other type of optical sensor for monitoring the position and orientation of portable user device 130/230 in real-world environment 140.

As another alternative, or in addition to IR tracking and/or the use of one or more cameras, tracking device 122 may include multiple components distributed within real-world environment 140 and configured to perform radio-signal triangulation to monitor the position and orientation of portable user device 130/230 in real-world environment 140. As yet another alternative, base station 102/202 may utilize optional mapping device 108/208 configured to utilize a SLAM technique to monitor the position and orientation of portable user device 130/230 in real-world environment 140. Thus monitoring of the position and orientation of user device 130/230 in real-world environment 140 using tracking device 122 and/or mapping device 108/208 may be performed by virtual effects software code 120/220a of base station 102/202, executed by hardware processor 104.

Alternatively, or in addition, in some implementations portable user device 130/230 may include RFID reader 252 and/or P/L sensor(s) 238, and may be configured to monitor its own position and orientation in real-world environment 140, and to report that position and orientation to base station 102/202. In those implementations, portable user device 130/230 may utilize transceiver 216b and wireless communication link 146/246 to self-report its position and orientation, i.e., the location, yaw, pitch, and roll of user device 130/230 in real-world environment 140. Monitoring the position and orientation of portable user device 130/230 in real-world environment 140 in response to self-reporting by portable user device 130/230 may be performed by virtual effects software code 120/220a of base station 102/202, executed by hardware processor 104/204, and using transceiver 116/216a and wireless communication link 146/246. It is noted that the monitoring of the position and orientation of portable user device 130/230 in optional action 364 may be performed periodically, or may be performed substantially continuously while portable user device 130/230 is present in real-world environment 140.

Flowchart 360 continues with detecting actuation of portable user device 130/230 in real-world environment 140 (action 365). As discussed above by reference to FIG. 1A, base station 102/202 may be configured to communicate with tracking device 122 or directly with portable user device 130/230 to detect actuation of portable user device 1301230 by user 144. For example, where portable user device 130/230 is a replica of a flashlight, actuation of portable user device 130/230 may include pointing portable user device 130/230 at an object or structure within real-world environment 140, such as wall structure 142 for example, and pressing a button or other actuation controller on portable user device 130/230 to mimic illuminating the replica flashlight. Analogously, where portable user device 130/230 is a replica of a laser pointer, or other pointing device, actuation of portable user device 130/230 may include pointing portable user device 130/230 at an object or structure within real-world environment 140, such as wall structure 142 for example, and pressing a button or other controller on portable user device 130 to mimic actuation of the replica pointing device.

In some implementations, detecting the actuation of portable user device 130/230 may be performed by virtual effects software code 120/220a of base station 102/202, executed by hardware processor 104, and using tracking device 122. However, in other implementations, detecting the actuation of portable user device 130/230 may be performed by virtual effects software code 120/220a of base station 1021202, executed by hardware processor 104, as the result of direct communication between base station 102/202 and portable user device 130/230 via wireless communication link 146/246.

Flowchart 360 can conclude with controlling display device 126A/126B to display one or more virtual effects 112/212, identified in action 363, in real-world environment 140, based on the mapping obtained in action 362, and the position and orientation of portable user device 130/230 during the actuation detected in action 365 (action 366). As discussed above, in some implementations, the method outlined by flowchart 360 may include monitoring the position and orientation of portable user device 130/230 in real-world environment 140 in optional action 364. In those implementations, the position and orientation of portable user device 130/230 during its actuation may be determined as part of that monitoring action. However, in implementations in which optional action 364 is omitted, actions 365 and 366 may follow directly from action 363, and position and orientation of portable user device 130/230 during the actuation detected in action 365 may be performed on the fly in response to the detected actuation.

For example, and as noted above, enhanced vision system 100A/100B may include tracking device 122 communicatively coupled to base station 102/202. Tracking device 122 may be configured to determine the position and orientation of portable user device 130/230 in real-world environment 140 when the actuation of portable user device 130/230 is detected. For instance, and as also noted above, portable user device 130/230 may include one or more IR emitters detectable by tracking device 122 in the form of an IR camera or other IR sensor. Alternatively, or in addition, tracking device 122 may include a camera, camera array, or one or more other type of optical sensor for determining the position and orientation of portable user device 130/230 in real-world environment 140 when the actuation of portable user device 130/230 is detected.

As another alternative, or in addition to IR tracking and/or the use of one or more cameras, tracking device 122 may include multiple components distributed within real-world environment 140 and configured to perform radio-signal triangulation to determine the position and orientation of portable user device 130/230 in real-world environment 140 when the actuation of portable user device 130/230 is detected. As yet another alternative, base station 102/202 may utilize optional mapping device 108/208 configured to utilize a SLAM technique to determine the position and orientation of portable user device 130/230 in real-world environment 140 when the actuation of portable user device 130/230 is detected. Thus determining of the position and orientation of user device 130/230 in real-world environment 140 using tracking device 122 and/or mapping device 108/208 may be performed by virtual effects software code 120/220a of base station 102/202, executed by hardware processor 104.

Alternatively, or in addition, in some implementations portable user device 130/230 may include RFID reader 252 and/or P/L sensor(s) 238, and may be configured to determine its own position and orientation in real-world environment 140, and to report that position and orientation to base station 102/202. In those implementations, portable user device 130/230 may utilize transceiver 216b and wireless communication link 146/246 to self-report its position and orientation, i.e., the location, yaw, pitch, and roll of user device 130/230 in real-world environment 140 when the actuation of portable user device 130/230 is detected. Determining the position and orientation of portable user device 130/230 in real-world environment 140 in response to self-reporting by portable user device 130/230 may be performed by virtual effects software code 120/220a of base station 102/202, executed by hardware processor 104/204, and using transceiver 116/216a and wireless communication link 146/246.

In some implementations, as shown in FIG. 1A, display device 126A may include one or more projectors, and controlling display device 126A projects one or more virtual effects 112/212 onto the surface of wall structure 142 or another surface within real-world environment 140. As noted above, when implemented as one or more projectors, display device 126A may include a stand-alone wide-field projection system, such as a spinning POV projected illumination spinning scan line, for example. Alternatively, display device 126A may be implemented as a fisheye lens projector, or as multiple stitched projection-mapped video projectors.

According to the exemplary implementation shown in FIG. 1B, by contrast, display device 126B of enhanced vision system 100B is wall structure 142 itself, where wall structure 142 includes multiple display elements 148. According to the exemplary implementation shown in FIG. 1B, base station 102/202 controls display device 126B using display data 128 to actuate at least some of display elements 148 of wall structure 142, to render one or more virtual effects 112/212. In various implementations, and as also noted above, wall structure 142 may be an LED wall including display elements 148 in the form of LEDs, or an organic OLED wall including display elements 148 in the form of OLEDs. Action 366 may be performed by virtual effects rendering software code 120/220a of base station 102/202, executed by hardware processor 104/204.

In some implementations, action 366 may include determining a viewing perspective of user 144 of portable user device 1301230, and controlling display device 126A/126B to display one or more virtual effects 112/212 in real-world environment 140 further using the determined viewing perspective of user 144. Determining the viewing perspective of user 144 may include approximating the viewing distortion experienced by user 144 relative to the position and orientation of portable user device 130/230 during its actuation. In some implementations, as discussed above, tracking device 122 may be configured to perform eye tracking or skeleton tracking of user 144 in real-world environment 140. Alternatively, or in addition, tracking data 124 generated by tracking device 122 may include optical data enabling virtual effects rendering software code 120/220a, executed by hardware processor 104/204 of base station 102/202, to estimate the viewing perspective of user 144 based on the distance separating the eyes of user 144 from portable user device 130/230, and/or based on the head position of user 144.

Figure 4A:
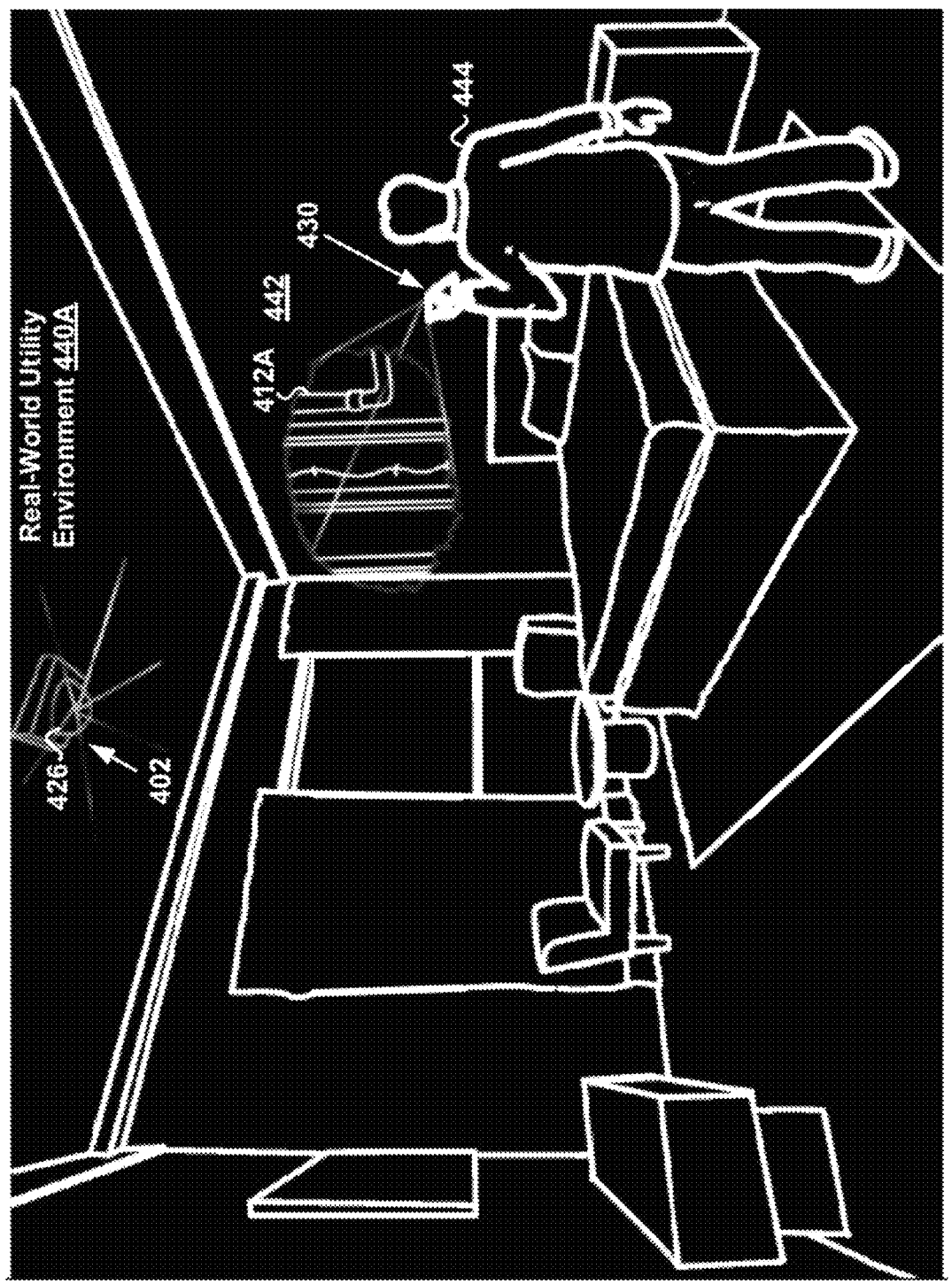
FIG. 4A shows an exemplary utility application for an enhanced vision system, according to one implementation.

Referring now to FIG. 4A, FIG. 4A shows an exemplary utility application for an enhanced vision system. According to the exemplary implementation shown in FIG. 4A, the enhanced vision system includes base station 402 having integrated display device 426 in the form of a projection device, and portable user device 430 carried by user 444. As shown in FIG. 4A, user 444 utilizes portable user device 430 to cause virtual effects 412A to be displayed on the surface of wall structure 442 of real-world utility environment 440A.

Real-world utility environment 440A, wall structure 442, display device 426, and user 444 correspond respectively in general to real-world environment 140, wall structure 142, display device 126A, and user 144, in FIG. 1A, and those corresponding features may share any of the characteristics attributed to either of the respectively corresponding features by the present disclosure. In addition, base station 402, portable user device 430, and virtual effects 412A correspond respectively in general to base station 102/202, portable user device 130/230, and virtual effects 112/212, in FIGS. 1A and 2. Consequently, base station 402, portable user device 430, and virtual effects 412A may share any of the characteristics attributed to respective base station 102/202, portable user device 130/230, and virtual effects 112/212 by the present disclosure, and vice versa.

According to the exemplary residential or industrial utility use case depicted in FIG. 4A, virtual effects 412A showing the locations and layouts of pipes, electrical wiring, and wall studs, for example, can be utilized to advantage by user 144 in a number of different ways. For instance, virtual effects 412A may be used to mitigate damage to real-world utility environment 440A due to a pipe leak by enabling rapid identification of the likely source of the leak. Alternatively, or in addition, virtual effects 412A may be used to enhance the safety of user 144 during repair or renovation work performed in real-world utility environment 440A by identifying the locations and layouts of pipes and live electrical wiring. In addition, or alternatively, virtual effects 412A may be used to make a project such as hanging a heavy mirror or flat screen TV on wall structure 442 faster and safer by identifying the locations of wall studs for securely anchoring those objects to wall structure 442.

Figure 4B:
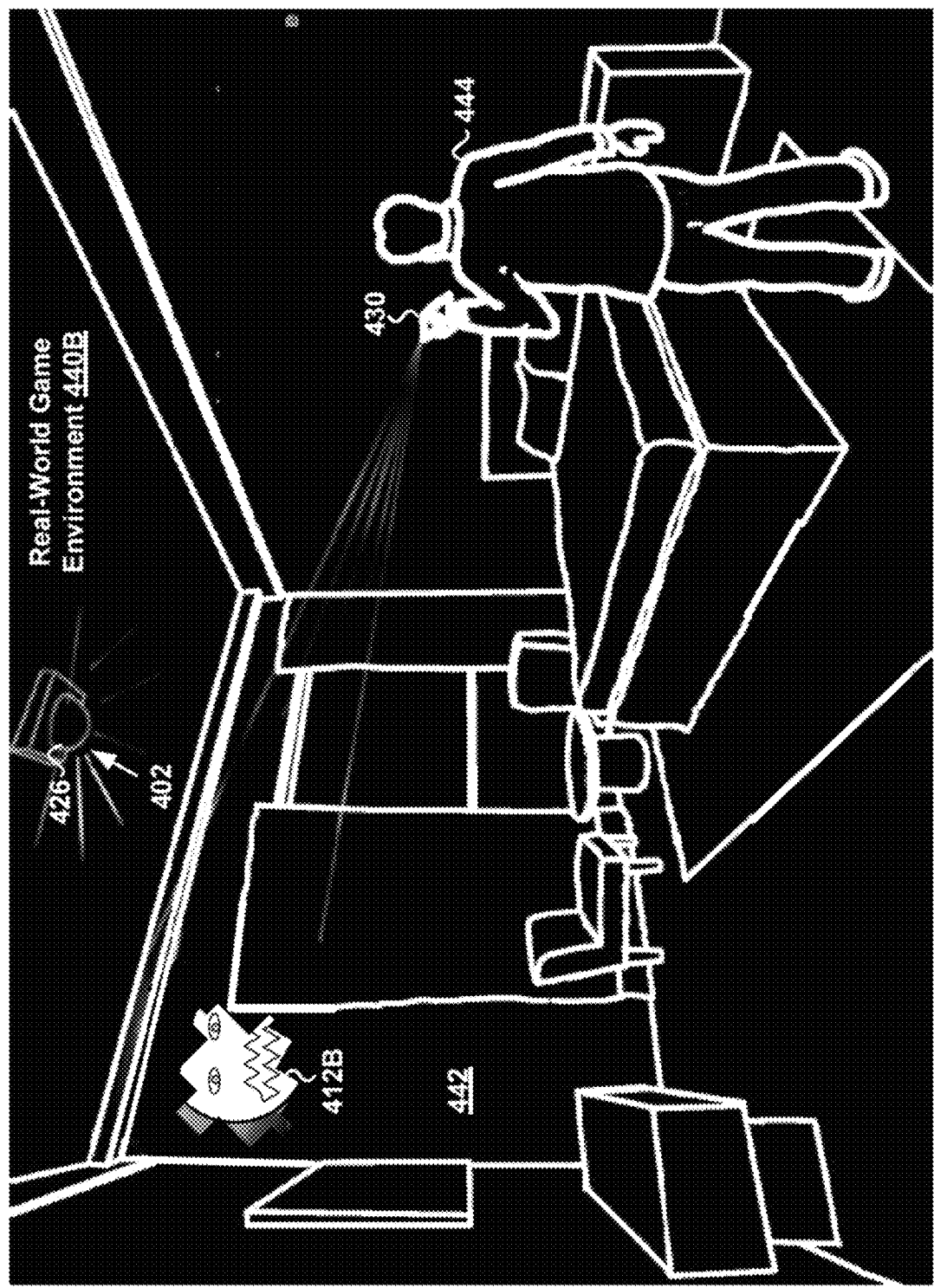
FIG. 4B shows an exemplary game application for an enhanced vision system, according to one implementation.

FIG. 4B shows an exemplary game application for an enhanced vision system. It is noted that any feature in FIG. 4B identified by a reference number identical to a reference number appearing in FIG. 4A corresponds to that previously described feature and may share any of the characteristics attributed to it above. As shown in FIG. 4B, real-world game environment 440B includes virtual effects 412B as an image of a game figure, such as a virtual character, projected onto a surface of wall structure 442.

In the exemplary applications shown by each of FIGS. 4A and 4B, projection of virtual effects 412A/412B by projection device 426 is performed using a programmatic assumption of the location of user 444, based on the location of portable user device 430, to create an eye-point specific projection. The projection of virtual effects 412A/412B appears to user 444 to be produced by portable user device 430, although in reality, virtual effects 412A/412B are actually coming from projection device 426 (e.g., an overhead wide-angle projection device), which may cover a large portion of real-world environments 440A/440B, up to 360°.

It is noted that although FIGS. 4A and 4B depict display of virtual effects 412A/412B using projection device 426, in other implementations, wall structure 442 may include display elements 148, shown in FIG. 1B, which may be LEDs or OLEDs, for example. In implementations in which wall structure 442 includes display elements 148, base station 402 may be configured to control display elements 148, rather than projection device 426, to render virtual effects 412A/412B.

It is further noted that, in addition to the utility and game applications depicted in FIGS. 4A and 4B, the enhanced vision systems disclosed in the present application may have myriad other practical uses. For instance, such an enhanced vision system can be used to virtually redecorate a residence by generating virtual effects in the form of paint colors, wall coverings, flooring, furniture, and/or art objects, advantageously saving a home owner the time, effort, and expense of experimenting with real-world versions of those features. As another example, and by analogy, the expense and labor involved in retrofitting or otherwise upgrading a manufacturing facility may be greatly reduced utilizing the virtual effects produced by an enhanced vision system to simulate the planned facility changes.

Thus, the present application discloses enhanced vision systems and methods that overcome the drawbacks and deficiencies in the conventional art. According to the present novel and inventive concepts, a system user can experience the enhanced vision made possible by AR without the discomfort or inconvenience associated with wearing AR eyewear or headgear. Instead, the user may actuate a portable device, such as a handheld device simulating a laser pointer or flashlight, for example, to point at an object or a region of the user's real-world environment. Based on the particular application of the enhanced vision system, a mapping of the environment in which the portable user device is utilized, the location and orientation of the portable user device when it is actuated, and in some implementations the perspective of the user with respect to the object or region pointed to, virtual effects providing an enhanced vision experience are displayed to the user. The enhanced vision solution disclosed by the present application may advantageously be utilized in a wide variety of use cases including AR games, architectural inspection, and industrial and residential safety.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An enhanced vision system comprising:
   a base station including a hardware processor and a memory storing a virtual effects rendering software code;
   a display device situated in a real-world environment having one or more surfaces and communicatively coupled to the base station; and
   a portable user device separate from the base station and the display device;
   wherein the base station is configured to track the portable user device; and
   wherein the hardware processor is configured to execute the virtual effects rendering software code to:
      detect the portable user device in the real-world environment;
      obtain a mapping of the real-world environment;
      identify one or more virtual effects for display by the display device on the one or more surfaces in the real-world environment;
      detect, based on tracking the portable user device in the real-world environment, a position and an orientation of the portable user device in the real-world environment indicative of the portable user device being pointed at a first surface of the one or more surfaces in the real-world environment; and
      control, based on detecting, the display device to display the one or more virtual effects on the first surface in the real-world environment based on the mapping, and the position and the orientation of the portable user device.

2. The enhanced vision system of claim 1, wherein the hardware processor is further configured to execute the virtual effects rendering software code to:
   determine a viewing perspective of a user of the portable user device; and
   control the display device to display the one or more virtual effects on the first surface in the real-world environment further based on the determined viewing perspective of the user of the portable user device.

3. The enhanced vision system of claim 1, wherein the display device comprises a projector, and wherein the hardware processor is further configured to execute the virtual effects rendering software code to control the display device to project the one or more virtual effects on the first surface in the real-world environment.

4. The enhanced vision system of claim 3, wherein the first surface is a surface of a wall, and wherein the features include wires, pipes or structural supports.

5. The enhanced vision system of claim 1, wherein the display device comprises the first surface in the real-world environment, the first surface including a plurality of display elements, and wherein the hardware processor is further configured to execute the virtual effects rendering software code to control the display device to activate at least one of the plurality of display elements to render the one or more virtual effects.

6. The enhanced vision system of claim 1, wherein the base station and the portable user device are configured to be in wireless communication, and wherein the base station is configured to receive the position and the orientation of the portable user device in the real-world environment from the portable user device.

7. The enhanced vision system of claim 1, wherein the portable user device is one of a handheld device or a wearable device.

8. The enhanced vision system of claim 1, further comprising a tracking device communicatively coupled to the base station, wherein the hardware processor is configured to execute the virtual effects rendering software code to:
   determine, using the tracking device, the position and the orientation of the portable user device in the real-world environment.

9. The enhanced vision system of claim 1, further comprising a mapping device communicatively coupled to the base station, wherein the hardware processor is configured to execute the virtual effects rendering software code to:
   obtain, using the mapping device, the mapping of the real-world environment.

10. The enhanced vision system of claim 9, wherein the mapping device comprises at least one of a camera or a Light Detection and Ranging (lidar) device.

11. A method for use by an enhanced vision system including a base station having a hardware processor and a memory storing a virtual effects rendering software code, a display device situated in a real-world environment having one or more surfaces and communicatively coupled to the base station, and a portable user device separate from the base station and the display device, the base station being configured to track the portable user device, the method comprising:
   detecting, by the virtual effects rendering software code executed by the hardware processor, the portable user device in the real-world environment;

obtaining, by the virtual effects rendering software code executed by the hardware processor, a mapping of the real-world environment;

identifying, by the virtual effects rendering software code executed by the hardware processor, one or more virtual effects for display by the display device on the one or more surfaces in the real-world environment;

detecting, by the virtual effects rendering software code executed by the hardware processor and based on tracking the portable user device in the real-world environment, a position and an orientation of the portable user device in the real-world environment indicative of the portable user device being pointed at a first surface of the one or more surfaces in the real-world environment; and controlling, by the virtual effects rendering software code executed by the hardware processor and based on detecting, the display device to display the one or more virtual effects on the first surface in the real-world environment based on the mapping, and the position and the orientation of the portable user device.

12. The method of claim 11, further comprising:

determining, by the virtual effects rendering software code executed by the hardware processor, a viewing perspective of a user of the portable user device; and wherein controlling the display device to display the one or more virtual effects on the first surface in the real-world environment is performed further based on the determined viewing perspective of the user of the portable user device.

13. The method of claim 11, wherein the display device comprises a projector, and wherein controlling the display device includes projecting the one or more virtual effects on the first surface in the real-world environment.

14. The method of claim 13, wherein the first surface is a surface of a wall, and wherein the features include wires, pipes or structural supports.

15. The method of claim 11, wherein the display device comprises the first surface in the real-world environment, the first surface including a plurality of display elements, and wherein controlling the display device includes activating at least one of the plurality of display elements to render the one or more virtual effects.

16. The method of claim 11, wherein the base station and the portable user device are in wireless communication, and wherein the base station receives the position and the orientation of the portable user device in the real-world environment from the portable user device.

17. The method of claim 11, wherein the portable user device is one of a handheld device or a wearable device.

18. The method of claim 11, wherein the position and the orientation of the portable user device in the real-world environment is determined using a tracking device communicatively coupled to the base station.

19. The method of claim 11, wherein obtaining the mapping of the real-world environment is performed using a mapping device communicatively coupled to the base station.

20. The method of claim 19, wherein the mapping device comprises at least one of a camera or a Light Detection and Ranging (lidar) device.

* * * * *